May 31, 1966 R. W. MOUNT 3,253,730
ELECTRICAL OUTLET BOX WITH PROTECTIVE COVER
Filed Dec. 2, 1963 2 Sheets-Sheet 1

INVENTOR.
RALPH W. MOUNT.
BY John A. Young
his ATTORNEY.

May 31, 1966 R. W. MOUNT 3,253,730
ELECTRICAL OUTLET BOX WITH PROTECTIVE COVER
Filed Dec. 2, 1963 2 Sheets-Sheet 2

INVENTOR.
RALPH W. MOUNT.
BY John A. Young.
his ATTORNEY.

3,253,730
ELECTRICAL OUTLET BOX WITH PROTECTIVE COVER
Ralph W. Mount, R.F.D. 1, Zeleniople, Pa.
Filed Dec. 2, 1963, Ser. No. 327,266
3 Claims. (Cl. 220—3.4)

This invention relates to an improved electrical outlet box and more particularly to the combination of an electric outlet box with a protective cover adapted to keep out foreign material in the form of plaster, or other materials which serve as a hindrance to the pulling of wires and other operations incident to electrical outlet box usage.

In construction practice, the outlet box is mounted on the unfinished wall prior to plastering and then during plastering operation, it sometime happens that the outlet box is inadvertently covered over and cannot be located. In the event that the box is "lost" the electrician must spend a substantial amount of time tapping the wall or using a magnet or some other locating means in an attempt to locate the outlet box. This inconvenience necessarily adds time and expense to construction costs and should be avoided. Unfortunately, there is no ready means for locating a plastered over "lost" outlet box and it is a common occurrence to have just such losses occur in the manner described and during subsequent plastering operations.

It is one of the important objects of the present invention to protect the interior of the outlet box against entry of plaster, foreign objects of various kinds and to accomplish this by means of a novel, compressible protective member which is located between the cover plate and the outlet box, this protective member being breakable so that when it comes time to pull the wires and attach them within the outlet box, the protective cover can be readily broken away and access had therein.

It is a further object of the present invention, to provide a novel, compressible protector member which serves as a gasket between the cover plate and the junction box so that in addition to protecting the interior of the junction box, the fastener means between the cover plate and junction box can be screwed down compressing by preferred amounts the plastic material, and in doing so, bringing the cover plate flush with the surface of the finished wall. This is an important feature of the invention because it provides the installer with a convenient means for adjusting the location of the cover plate in relation to the finished wall and the two are made flush with each other without costly chipping and cutting, removing and reinstalling operations.

A further object of the present invention is to provide a novel combination of protector and locator means in which the locator means may be comprised of a flexible prong or the like projecting sufficiently outwardly from the cover plate so that it will not or cannot readily be covered with plaster and therefore, even in the event that the cover plate is completely covered with plaster, still the flexible locator will provide a visual indication where the box is located.

In another embodiment of the invention, the protector member or shield, is provided with a known dye material which will, upon contact with the plaster, provide a coloring that penetrates through the thickness of the plaster and produces a surface coloring at the outer surface of the wall to give an indication for the location of the mounting box.

It is an important feature of the present invention that the protector can take numerous different forms, including that of a plug, a combination plug-and-gasket, etc., and can be adopted for either rectangular, circular or other cross-sectional shapes for the access opening in the cover plate.

Other objects and features of the present invention will become apparent from a consideration of the following description, which proceeds with reference to the accompanying drawings, wherein.

Figure 6:
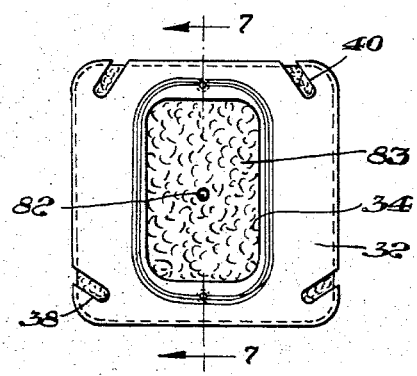
Figure 7:
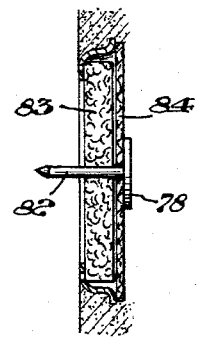
Figure 8:
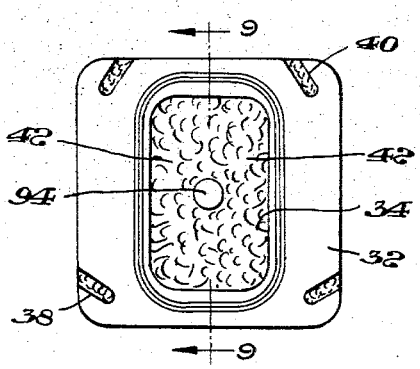
Figure 9:
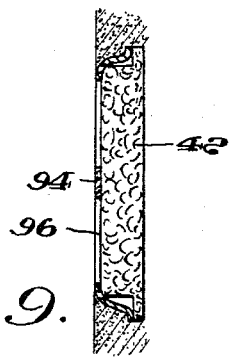

FIGURES 6 and 7 are front elevational view and sectional views, respectively, for a further embodiment of the invention which shows a novel combination of cover plate and protector; and, FIGURES 8 and 9 show a still further embodiment of the invention in which the indicator is in the form of a color-producing agent which penetrates through the thickness of the plaster in the event that the junction box is covered.

Referring now to the drawings, the outlet box designated generally by reference numeral 10 is a rectangular box construction in which one of the sides 12 has portions 14, 16 which are removed to provide inlets for wires which are pulled into the interior of the box by the electrician and suitable connections there made for the electrical service. At the open end 18 of the box, are lugs 20, 22 with threaded openings 24 to receive threaded screws 28, 30 which clamp cover plate 32 having access opening 34 therein to the box 10. The screws are passed through slots 38, 40 and the heads of the screws pull the cover plate 32 tightly against the outlet box 10 when the screws 28, 30 are turned down. Between the box 10 and cover 32 is a plastic protector shield 42 which is a breakable material, is resistant to moisture and does not damage the wire by scraping it or otherwise injuring it when the wire is pulled into the box. Typically, the material is comprised of Styrofoam, polystyrene or other compressible material and the shield is proportioned so that it not only shields the access opening 34 in the cover 32 but also is proportioned to be of substantially the same dimension as the opening 18, the outer edge thereby serving as a gasket between the box 10 and cover plate 32.

Figure 3:
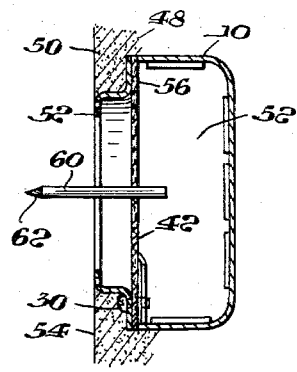
FIGURE 3 is a section view taken on line 3—3 of FIGURE 2.

The box 10 is normally set in the unfinished wall 48 (FIGURE 3), before the plaster layer 50 is applied and quite often the plaster finds access into the interior of the box; but with the shield 42 in place (FIGURE 3) this is no longer possible, the shield 42 having sufficient strength to shut out the plaster and prevent other foreign material from entering into the interior of the box 10.

When the plastering operation is completed, it is only necessary to apply force against the face of the shield 42 by inserting a thumb or forefinger through the access opening 34, or by using some suitable tool, and cracking out the shield 42 thereby permitting access into the protected interior 52 from which the plaster has been excluded.

The outer face 52 of the cover plate is made flush with the surface 54 of the plastered surface by turning down or backing off on the screws 28, 30, the resilient gasket portion 56 (FIGURE 3) of the shield 42 providing at least this thickness of adjustment for the axial position of the outer face 52 whereby such outer face 52 can be made flush with the finished plaster wall 54. This renders unnecessary previous chipping and resetting operations.

Because in the process of plastering it sometimes happens that the entire box is covered over with plaster, it is important to provide some means for conveniently locating the box, this being in the form of a piercing stud 60 having a pointed end 62 to facilitate pushing the locator stud 60 through the surface of the shield 42, and extending it sufficiently far away from the wall surface so that the end of the stud 60 will extend through the plastered wall even though the remaining part of the box is completely covered over. Also, the stud 60 is resilient so that it is yieldable when struck by the trowel of the plasterer and will not make a bigger opening or tear the shield 42 when it is so struck.

After the plaster dries, the locator 60 provides a convenient means for visually spotting the location of the box and the plaster is then chipped away and removed. The locator stud 60 is preferably of round cross section rather than square cross section so that it can be hit at any angle without causing a tear or enlarging the opening in the shield 42.

Figures 4, 4A:
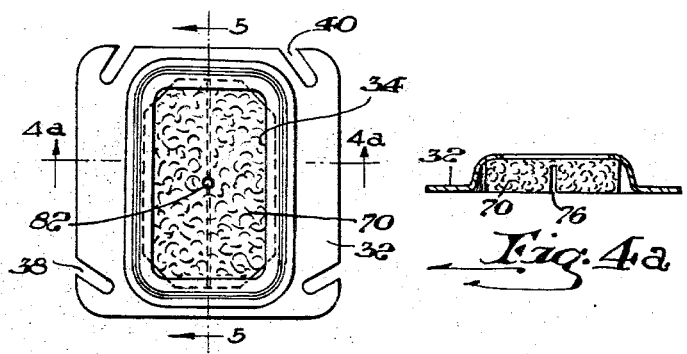
FIGURES 4, 4A and 5 are front elevation view and sectional views, respectively, taken on line 4A—4A and 5—5 of FIGURE 4 for the cover plate and protector combination.
Figure 5:
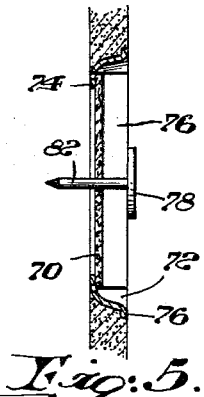

Referring next to the embodiment shown in FIGURES 4, 4A and 5, the shield 70 may be proportioned to fit entirely within the recess 72 of cover plate 74 with the outer edge 76 being in metal-to-metal contact with the opposing edges of the box, and is bonded by glue or other adhesive within a recess of the cover 32. The shield may also include a score line 76 to facilitate breaking out of the shield and also to insure that the shield does break, it is broken into larger pieces than would otherwise be the case.

The piercing locator 78 is in the form of a plastic tack with the head 80 providing enough reenforcement so that even when the piercing portion 82 is contacted by the plasterer, it will not tend to wobble within the pierced opening thereby creating an oversize opening through which some plaster might find ingress.

Figure 1:
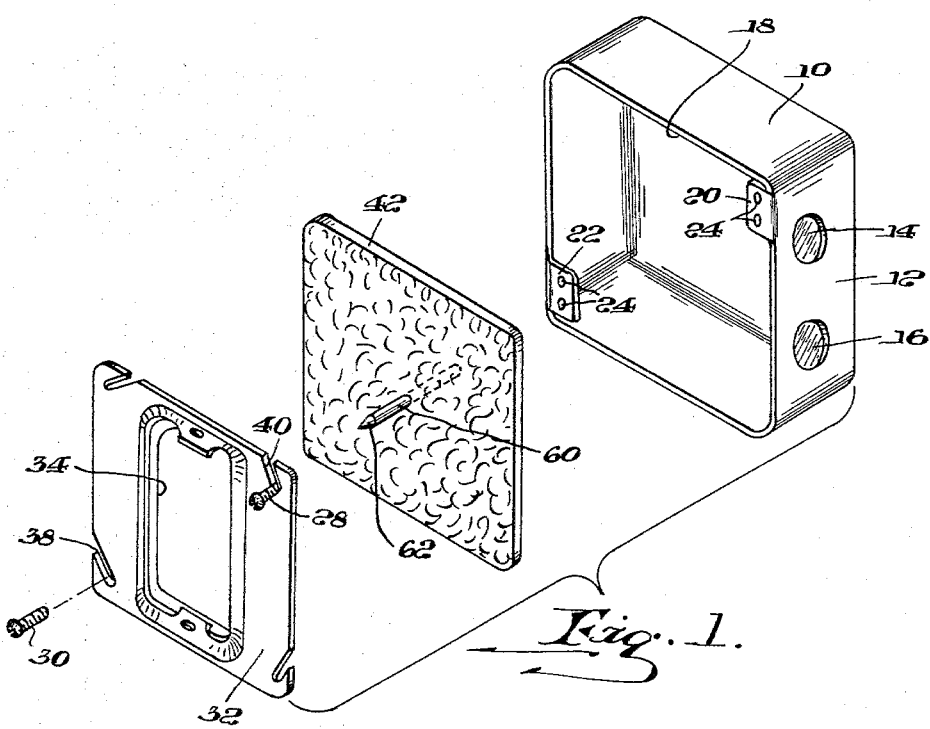
FIGURE 1 is an isometric exploded view of the outlet box with the cover plate, protector and indicator.

In a still further embodiment of the invention, referring to FIGURES 6 and 7, the shield may be constructed in two portions, the one portion 82 serving as a plug which is glued to the interior recess of the cover plate, the same as in the embodiment of FIGURES 4 and 5 and the second portion 84 being constructed the same, and serving the same function as the shield 42 in FIGURE 1.

Also, the two shield portions 82, 84 can be made integrally in the manner shown in FIGURES 8 and 9.

The embodiments shown in FIGURES 4, 5, 6–7, 8–9 are inclusive of only the shield and cover plate and these two parts are cooperative with the box 10 the same as in the previous embodiment with the exception that in FIGURES 4, 4A and 5, the adjustment to bring the outer face of the cover into flush contact with the plastered wall is not possible because there is no gasket portion for the shield between the box 10 and the cover 32.

Figure 2:
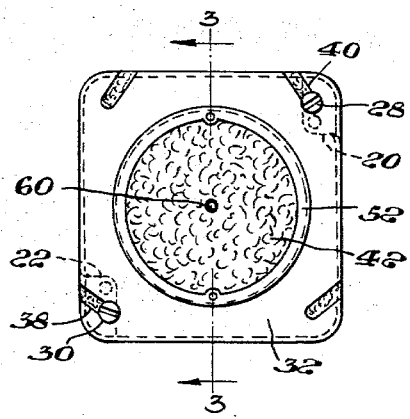
FIGURE 2 is an elevation view of the assembled structure of FIGURE 1.

There is electrical contact between the cover 32 and the box 10 with screws 28 in the embodiments of FIGURES 1–2; 6–7 and 8–9. Electrical contact may be made directly between the outer periphery of the cover plate and the edge of the box 10 by omitting the gasket portion of the shield 42 as shown in the embodiment of FIGURES 4, 4A, 5.

The locator, shown in the embodiments FIGURES 1–7, can be replaced by a capsule of coloring material which is fully set forth and claimed in U.S. Patent No. 2,497,928, assigned to U. O. Colson Co. of Paris, Illinois. In this case, the coloring agent in the form of a capsule or the like 94 is bonded to the surface 96 of the shield 42 and should any plaster cover over the surface of the box, the coloring dye will penetrate through the thickness of the plaster and produce a discoloration on the wall readily indicating the location for the junction box, and in that manner serving the same general function as the mechanical locator 60.

The shield material is in all instances characterized by a non-flammable material which can be easily broken out and will serve the temporary or intermediate function of protecting the interior of the box from plaster or other foreign material and can be readily removed at the time the wires are pulled and electrical connections made within the interior of the box.

The invention is not, of course, limited to polystyrene, Styrofoam or other plastic material but includes as well other materials which are capable of performing the same function of being breakable and thereby being readily removable while possessing enough moisture resistance and strength to serve in the capacity of a temporary shield.

These foregoing advantages, together with the additional advantages of providing a "built-in" adjustment whereby the surface of the fixture can be made flush with the plastered wall, is an important feature which prevents any disturbance to the finished wall and removal of the box in order not to add any false depth to correct for protrusions of the boxed cover beyond the finished wall surface.

Although the present invention has been illustrated and described in connection with certain example embodiments, it will be understood that these are illustrative of the invention and are by no means restrictive thereof. It is reasonably to be expected that those skilled in this art can make numerous revisions and adaptations of the invention to suit individual design requirements, and it is intended that revisions and changes as incorporate the herein disclosed principles, will be included within the scope of the following claims as equivalents of the invention.

I claim:

1. A process for mounting and subsequently locating an outlet box comprising the steps of: superimposing a cover which has an opening therein over the opened end of the outlet box, disposing a readily breakable compressible plastic material shield between the outlet box and cover therefor and which is proportioned to extend completely over said box to exclude entry of foreign material into said box, compressing the plastic material shield to adjust the position of the cover plate portion of said box in relation to a wall, locating the outlet box within a wall structure, and thereafter breaking away said compressible plastic material shield through an access opening of said cover to provide access to the interior of said box.

2. An improved electrical outlet box, comprising: a box structure; a cover of compressible breakable polystyrene, Styrofoam material which is adapted for placement against said box; a cover plate having an access opening which is completely shielded by said breakable material to prevent entry of foreign material therethrough, said access opening being penetrated by the breaking out of said breakable material; fastener means for securing said cover plate and breakable material to the box structure; said breakable material having a marginal portion which forms a gasket of compressible material between said box and cover plate whereby said fastener means are adjustable to vary the distance between the cover plate and box and thereby to adjust the mounted position for said cover and locating means combined with said box structure to provide an indication of where the outlet box is disposed when the outlet box structure is wholly imbedded in a wall or other location and is thereby hidden.

3. The improved electrical outlet box in accordance with claim 2, including: a locator in the form of a dye which penetrates through the overlying layer of plastic material to provide a surface color for location of the junction box.

(References on following page)

References Cited by the Examiner

UNITED STATES PATENTS

| | | | |
|---|---|---|---|
| 1,758,126 | 5/1930 | Peterson | 220—3.4 |
| 2,004,878 | 6/1935 | MacNaught | 229—87 |
| 2,497,928 | 2/1950 | Cafiero | 220—3.4 |
| 2,666,546 | 1/1954 | Reilly | 220—3.4 |
| 2,832,494 | 4/1958 | Baldwin | 220—3.4 |
| 2,989,206 | 6/1961 | McAfee | 220—3.7 |
| 3,015,408 | 1/1962 | Campbell et al. | 220—3.4 |
| 3,015,409 | 1/1962 | Campbell et al. | 220—3.4 |
| 3,023,464 | 3/1962 | Zerbe | 206—46 X |
| 3,131,512 | 5/1964 | MacLeod | 220—3.8 X |

THERON E. CONDON, *Primary Examiner.*

R. H. SCHWARTZ, R. A. JENSEN, *Assistant Examiners.*